(12) United States Patent
Hasskerl et al.

(10) Patent No.: US 7,608,306 B2
(45) Date of Patent: Oct. 27, 2009

(54) METHOD FOR THE PRODUCTION OF ANTI-STATICALLY COATED MOULDED BODY

(75) Inventors: Thomas Hasskerl, Kronberg (DE); Stipan Katusic, Kelkheim (DE); Patrick Becker, Muehltal (DE); Rolf Neeb, Pfungstadt (DE); Ghirmay Seyoum, Egelsbach (DE)

(73) Assignee: Evonik Degussa GmbH, Essen (DE)

( * ) Notice: Subject to any disclaimer, the term of this patent is extended or adjusted under 35 U.S.C. 154(b) by 461 days.

(21) Appl. No.: 10/548,878

(22) PCT Filed: Mar. 2, 2004

(86) PCT No.: PCT/EP2004/002063

§ 371 (c)(1),
(2), (4) Date: Sep. 14, 2005

(87) PCT Pub. No.: WO2004/081122

PCT Pub. Date: Sep. 23, 2004

(65) Prior Publication Data

US 2006/0157675 A1 Jul. 20, 2006

(30) Foreign Application Priority Data

Mar. 14, 2003 (DE) ................. 103 11 639

(51) Int. Cl.
  C08F 2/46 (2006.01)
  C09D 4/00 (2006.01)
(52) U.S. Cl. ............ 427/487; 427/372.2; 427/393.5; 427/457; 427/474; 428/413; 252/500; 252/518.1
(58) Field of Classification Search ........ 252/500, 252/502, 518.1; 524/399; 427/372.2, 393.5, 427/457, 474, 487; 428/413
See application file for complete search history.

(56) References Cited

U.S. PATENT DOCUMENTS

| | | | |
|---|---|---|---|
| 5,880,235 A | | 3/1999 | Schwind et al. |
| 5,908,585 A | | 6/1999 | Shibuta |
| 6,146,753 A | * | 11/2000 | Niimi et al. ............ 428/332 |
| 6,358,437 B1 | * | 3/2002 | Jonas et al. ............ 252/500 |
| 6,631,023 B1 | * | 10/2003 | Berneth et al. ............ 359/265 |
| 6,689,458 B1 | * | 2/2004 | Mikoshiba et al. ............ 428/339 |
| 2003/0124051 A1 | * | 7/2003 | Servaty et al. ............ 423/593 |
| 2004/0191485 A1 | | 9/2004 | Groothues et al. |
| 2004/0213989 A1 | | 10/2004 | Hasskerl et al. |
| 2004/0254282 A1 | * | 12/2004 | Suzuki et al. ............ 524/430 |
| 2005/0016213 A1 | | 1/2005 | Hasskerl et al. |
| 2005/0118434 A1 | | 6/2005 | Hasskerl et al. |

FOREIGN PATENT DOCUMENTS

| | | |
|---|---|---|
| DE | 101 29 374 | 1/2003 |
| EP | 0 514 557 | 11/1992 |
| EP | 0 911 859 | 4/1999 |
| EP | 0 962 943 | 12/1999 |
| GB | 2 288 184 | 10/1995 |
| JP | 8 012332 | 1/1996 |
| JP | 11314303 | * 11/1996 |
| WO | 01/77234 | 10/2001 |
| WO | WO/03/000808 | * 3/2003 |
| WO | WO03033591 | * 4/2003 |

OTHER PUBLICATIONS

U.S. Appl. No. 10/555,772, filed Nov. 7, 2005, Becker, et al.
U.S. Appl. No. 10/573,075, filed Mar. 23, 2006, Becker, et al.
U.S. Appl. No. 10/578,568, filed May 5, 2006, Hasskerl, et al.
U.S. Appl. No. 11/572,716, filed Jan. 26, 2007, Becker, et al.
U.S. Appl. No. 11/814,082, filed Jul. 17, 2007, Becker, et al.
U.S. Appl. No. 10/523,971, filed Feb. 8, 2005, Theil, et al.
U.S. Appl. No. 10/539,057, filed Jun. 15, 2005, Hasskerl, et al.
U.S. Appl. No. 10/538,887, filed Jun. 14, 2005, Hasskerl, et al.
U.S. Appl. No. 10/539,126, filed Jun. 16, 2005, Hasskerl, et al.

* cited by examiner

*Primary Examiner*—Mark Kopec
*Assistant Examiner*—Tri V Nguyen
(74) *Attorney, Agent, or Firm*—Oblon, Spivak, McClelland, Maier & Neustadt, L.L.P.

(57) ABSTRACT

A process is described for producing mouldings from plastics by coating a moulding on one or more sides with a lacquer system, the lacquer system being composed of a binder or a binder mixture, optionally a solvent or solvent mixture, optionally other additives usual in lacquer systems and optionally a thickener, and use can be made here of polymeric thickeners at from 0 to 20% content and oligomeric thickeners at from 0 to 40% content, in each case based on dry film (components a, c, d, e), from 5 to 500 parts by weight, based on a), of an electrically conductive metal oxide powder with a median primary particle size of from 1 to 80 nm and a percentage degree of aggregation of from 0.01 to 99%, from 5 to 500 parts by weight, based on a), of inert nanoparticles coated [sic] in a manner known per se and the lacquer cured.

37 Claims, No Drawings

METHOD FOR THE PRODUCTION OF ANTI-STATICALLY COATED MOULDED BODY

FIELD OF THE INVENTION

The invention relates to a process for producing plastics mouldings provided with electrical conductivity, to the plastics mouldings provided with electrical conductivity and to their uses.

PRIOR ART

EP 0 514 557 B1 describes a coating solution for forming a transparent, conductive coating, composed of pulverulent conductive particles, e.g. based on metal oxide, e.g. tin oxide in a matrix composed of a heat-curable silica-polymer-lacquer system. Coated substrates, e.g. ceramic surfaces, can have lacquer layers with thicknesses in the range of, by way of example, from 500 to 7000 Å (Ångström, $10^{-10}$ m). Emphasis is given to the advantage of using products in which the conductive particles are present predominantly in the form of individual particles, substantially or completely free from aggregates. Silica-polymer-lacquer systems are not at all suitable for the coating of many plastics substrates because they have to be cured at very high temperatures, and are generally very brittle, with poor adhesion.

EP-A 0 911 859 describes transparent, electrically conductive structures composed of a transparent substrate, a transparent, electrically conductive coating and another transparent coating. The electrically conductive particles used in a binder matrix comprise gold- or platinum-coated silver grains whose size is from 1 to 100 nm. In comparative examples use is made, inter alia, of particles composed of indium tin oxide (ITO) in the heat-curable siloxane-lacquer system.

DE 101 29 374 describes a process for producing mouldings from plastic with an electrically conductive coating, by coating a moulding on one side with a lacquer system, composed of a) a binder, b) where appropriate a solvent, c) where appropriate other additives usual in lacquer systems and d) from 10 to 300 parts by weight (based on component a)) of an electrically conductive metal oxide powder with a median particle size of from 5 to 130 nm in a manner known per se and, prior to the curing of the lacquer layer, treating or ageing the moulding in such a way that the concentration of the metal oxide powder particles in that half of the lacquer layer oriented towards the interface with the air increases in such a way that the location of at least 65% of the particles is within this half of the lacquer layer, and then curing the lacquer layer or permitting it to cure.

OBJECT

An object was to provide a process which produces mouldings composed of plastic with an electrically conductive coating and in which good conductivities are achieved even with less than the usual amounts of metal oxide powders. Electrically conductive metal oxide powders, e.g. indium tin oxide (ITO), may be used in pulverulent form in lacquer systems which can be used for producing electrically conductive coatings on mouldings of any type. A commercial disadvantage is the high price of the electrically conductive metal oxide powders, the result being that coatings of this type can be supplied only with very highly-priced products. The high price of, by way of example, indium tin oxide (ITO) powders results inter alia from the complicated sol-gel preparation process which encompasses a very large number of complicated operations. A further intention was to avoid the step needed in DE 101 29 374 comprising ageing of the previously coated plastics mouldings, the reason being that the plastics moulding is at that stage very susceptible to mechanical damage. A further intention was to find ways of replacing the very expensive ITO by lower-price products without substantially impairing the functionality of the coating, such as the electrical conductivity or the scratch resistance. Another object consisted in developing a lacquer system in which it is possible to incorporate maximum content of electrically conductive metal oxide powder and of nanoparticles without increasing the viscosity to the extent that processing of the lacquer system becomes impossible.

ACHIEVEMENT OF OBJECT

The object is achieved by way of a process for producing mouldings from plastic, by coating a moulding in a known manner on one side with a lacquer system, the lacquer system being composed of:
a) a binder or a binder mixture
b) optionally a solvent or solvent mixture and
c) optionally other additives usual in lacquer systems and
d) optionally a thickener, or a thickener mixture
e) from 5 to 500 parts by weight, (based on component a)), of an electrically conductive metal oxide powder with a median primary particle size of from 1 to 80 nm and a percentage degree of aggregation of from 0.01 to 99%, the meaning of the term degree of aggregation being that, to the percentage extent stated, the primary particles [sic] are composed of at least two primary particles.

The degree of agglomeration is determined optically by using a transmission electron microscope on the finished lacquer. The terms "particles, primary particles or individual particles", "aggregate" and "agglomerate" are used as defined in DIN 53 206 (August 1972).
f) and from 5 to 500 parts by weight, (based on component a)), of a nanopowder with a median primary particle size of from 2 to 100 nm and then curing the lacquer layer, or permitting it to cure.

The invention further provides mouldings which can be produced by the inventive process with an electrically conductive coating, and their uses.

WORKING OF THE INVENTION

The Binder or the Binder Mixture a)

The binder may be either a physically drying or a heat- or chemically-curable or a high-energy-radiation-curable, organic or mixed organic/inorganic binder or binder mixture.

An organic binder is composed of organic monomers, oligomers and/or polymers. Examples are: poly(meth)acrylates, vinyl (co)polymers, epoxy resins, polyurethanes or alkyd resins, crosslinking and non-crosslinking reactive diluents.

Reactive diluents are understood to be low-viscosity monomers which can be copolymerized into the lacquer, and crosslinking reactive diluents have two or more polymerizable groups in the molecule.

Examples of reactive diluents would be butyl acrylate or hydroxyethyl methacrylate, and an example of a crosslinking reactive diluent is hexanediol di(meth)acrylate. By way of example, a mixed organic/inorganic binder may be: polysiloxanes, silane cocondensates, silicones or block copolymers of the abovementioned compounds with organic polymers.

Other examples are hybrid polymers, these being used in the form of a mixture of their monomeric and their oligomeric components. These may be combinations of (meth)acrylates with epoxides or with isocyanates and with respective appropriate curing agents.

By way of example, suitable monomers are gamma-methacryloxypropyltrimethoxysilane (Silquest A174 NT), hexanediol diacrylate, trimethylolpropane triacrylate, Serpol QMA 189 (Servo Delden BV, NL), dipropylene glycol diacrylate, pentaerythritol tritetraacrylate [sic], Bisomer PPA6E, polypropylene glycol monoacrylate, Sartomer 335, ditrimethylolpropane tetraacrylate [sic], Sartomer CD 9038, ethoxylated bisphenol diacrylate, Sartomer CD 406, cyclohexanedimethanol diacrylate, Sartomer SR 335, lauryl acrylate, Sartomer SR 285, tetrahydrofurfuryl acrylate, Sartomer SR 339, 2-phenoxyethyl acrylate.

The Solvent b)

Solvents present where appropriate in the lacquer system may be alcohols, ether alcohols or ester alcohols. These may also be mixed with one another or where appropriate with other solvents, for example with aliphatic or aromatic hydrocarbons or esters.

Preferred solvents are alcohols, ether alcohols or mixtures of these, mixtures of alcohols with other solvents, e.g. butyl acetate, diacetone alcohol and toluene.

The Additives c)

Usual additives c) present where appropriate in the lacquer system may by way of example be flow control agents, wetting agents, dispersing additives, antioxidants, reactive diluents, antifoams, sterically hindered amine light stabilizers (HALS), or UV absorbers. Among the surface-active agents particular preference is given to the products Byk 045, Byk 335, Efka 83, Tego 440, silane GF16 (Wacker). Preferred UV absorbers are: Norbloc 7966, Bis-DHB-A (Riedel de Haen), CGL 104 (Ciba), 3-(2-benzotriazolyl)-2-hydroxy-5-tert-octylbenzylmethacrylamide, UVA 635-L from BASF, Uvinul N35, the Tinuvin grades 1130, 329 and 384. Preferred sterically hindered amine light stabilizers used are the Tinuvin grades 770, 440, 144, 123, 765, 292, 268.

The Thickener or the Thickener Mixture d)

The thickener or the thickener mixture used may comprise suitable polymers, by way of example the product PLEX® 8770 F, produced and marketed by Röhm GmbH & Co. KG. The product PLEX® 8770 F is a high-molecular-weight PMMA composed of about 75% by weight of methyl methacrylate and about 25% by weight of butyl acrylate. The viscosity number J is about 11 (determined in chloroform at 20 degrees celsius). The product is prepared by suspension polymerization, using 2,2'-azobis(isobutyronitrile) as initiator. The methods for suspension polymerization are known to the person skilled in the art.

Other suitable thickeners are: oligomeric epoxyacrylates, such as Ebecryl 605, Ebecryl 608, urethane acrylates such as Ebecryl 210, Ebecryl 264, Ebecryl 284, Ebecryl 5129, Ebecryl 1290; silicone acrylates such as Ebecryl 350 or Ebecryl 360; polyester acrylates such as Ebecryl 440, epoxy acrylates such as Jägalux 3300, polyester acrylates such as Jägalux 1300; polyethylene glycol diacrylates such as EM227 from IGM Resin BV, Waalwijk, NL. The products with the name Ebecryl are obtainable from UCB, Kerpen.

The Lacquer System Composed of a), b), c) and d)

A suitable physically-drying lacquer comprises, by way of example, 30% by weight of polymer, e.g. polymethyl methacrylate (co)polymer and 70% by weight of solvent, e.g. methoxypropanol and butyl acetate. After thin-layer application, the lacquer self-cures through evaporation of the solvent.

A suitable heat-curable lacquer may, by way of example, be a polysiloxane lacquer, which may be obtained by partial hydrolysis and condensation of alkylalkoxy-silanes. The curing takes place after evaporation of any solvents used through heating for some hours at, by way of example, from 60 to 120° C.

A suitable chemically-curable lacquer system may, by way of example, be composed of a mixture of polyisocyanates and polyols. Once the reactive components have been combined, the lacquer system self-cures within a period of from a few minutes to hours.

A suitable radiation-curable lacquer system is composed, by way of example, of a mixture of, where appropriate, polyunsaturated compounds having vinyl unsaturation and capable of free-radical polymerization, e.g. (meth)acrylate compounds. Curing follows exposure to high-energy radiation, e.g. UV radiation or electron beams, where appropriate after addition of a polymerization initiator activatable by the radiation. Examples are the scratch-resistant lacquers described in DE-A 195 071 74.

The constituents a), b) and c) here may represent a lacquer system based on poly(meth)acrylates, on polysiloxanes, on polyurethanes, on epoxy resins or on, where appropriate polyfunctional, vinylic monomers capable of polymerization by a free-radical route.

Particular preference is given to a lacquer system which comprises a binder which when cured has at least 5 mol %, preferably from 10 to 25 mol %, content of functional polar groups, based on the binder.

A suitable coating composition may be composed of aa) from 70 to 95% by weight, based on the entirety of components aa) to ee), of a mixture composed of polyalkylene oxide di(meth)acrylates of the formula (I)

$$H_2C=C(R)-C(O)-O-[CH_2-CH_2-O]_n-C(O)-C(R)=CH_2 \quad (I)$$

where n=from 5 to 30 and R=H or $CH_3$ where aa1) from 50 to 90% by weight of the mixture of the polyalkylene oxide di(meth)acrylates of the formula (I) are formed from polyalkylene oxide diols whose average molecular weight (Mw) is from 300 to 700 and aa2) from 50 to 10% by weight of the mixture of the polyalkylene oxide di(meth)acrylates of the formula (I) are formed from polyalkylene oxide diols whose average molecular weight (Mw) is from 900 to 1300 and bb) from 1 to 15% by weight, based on the entirety of components aa) to ee), of a hydroxyalkyl (meth)acrylate of the formula $$H_2C=C(R)-C(O)-O-[CH_2]_m-OH \quad (II)$$

where m =from 2 to 6 and R=H or $CH_3$ cc) from 0 to 5% by weight, based on the entirety of components aa) to ee) of an alkanepolyol poly(meth)acrylate as crosslinking agent dd) from 0.1 to 10% by weight, based on the entirety of components aa) to ee), of a UV polymerization initiator and ee) where appropriate other conventional additives for UV-curable coatings, for example UV absorbers and/or additives for flow control and rheology ff) from 0 to 300% by weight, based on the entirety of components aa) to ee), of a solvent easily removable by evaporation and/or from 0 to 30% by weight, based on the entirety of components aa) to ee), of a monofunctional reactive diluent.

The lacquer system described is the subject matter of DE-A 100 02 059 of Röhm GmbH & Co. KG dated Jan. 18, 2000.

A mixing specification with thickener has, by way of example, the following composition:

aa) from 70 to 95% by weight, based on the entirety of components aa) to ff), of a mixture composed of polyalkylene oxide di(meth)acrylates of the formula (I)

$$H_2C=C(R)-C(O)-O-[CH_2-CH_2-O]_n-C(O)-C(R)=CH_2 \quad (I)$$

where n=from 5 to 30
and R=H or CH$_3$
where
  aa1) from 50 to 90% by weight of the mixture of the polyalkylene oxide di(meth)acrylates of the formula (I) are formed from polyalkylene oxide diols whose average molecular weight (Mw) is from 300 to 700 and
  aa2) from 50 to 10% by weight of the mixture of the polyalkylene oxide di(meth)acrylates of the formula (I) are formed from polyalkylene oxide diols whose average molecular weight (Mw) is from 900 to 1300 and
bb) from 1 to 15% by weight, based on the entirety of components aa) to ff), of a hydroxyalkyl (meth)acrylate of the formula $$H_2C=C(R)-C(O)-O-[CH_2]_m-OH \quad (II)$$

where m=from 2 to 6
and R=H or CH$_3$
cc) from 0 to 5% by weight, based on the entirety of components aa) to ff) of an alkanepolyol poly(meth)acrylate as crosslinking agent
dd) from 0.1 to 10% by weight, based on the entirety of components aa) to ff), of a UV polymerization initiator and
ee) where appropriate other conventional additives for UV-curable coatings, for example UV absorbers and/or additives for flow control and rheology
ff) from 0 to 300% by weight, based on the entirety of components aa) to ff), of a solvent easily removable by evaporation and/or from 0 to 30% by weight, based on the entirety of components a) to e), of a monofunctional reactive diluent
gg) from 0.5 to 50% by weight, based on the entirety of components aa) to ff), of a thickener or thickener mixture.

Lacquer systems of this type can absorb water, because they have more than the usual content of functional polar groups, and they are used, by way of example, as coatings for motorcycle helmet visors, in order to prevent internal misting of the visor. The combination of the electrically conductive metal oxide powder with the absorption of water which practically always takes place from the environment leads to a further improvement in the electrical conductivity of the coating.

The Electrically Conductive Metal Oxide Powder e)

Suitable electrically conductive metal oxide powders e) have a primary particle size in the range from 1 to 80 nm. The metal oxide powder e) may in the undispersed condition also be aggregates and agglomerates of primary particles and aggregates, the particle size of the agglomerate here being up to 2000 or up to 1000 nm. The size of the aggregates is up to 500 nm, preferably up to 200 nm.

The median particle size of the primary particles of metal oxide powder may be determined with the aid of a transmission electron microscope and in the case of the primary particles is generally in the range from 5 to 50, preferably from 10 to 40 and particularly preferably from 15 to 35 nm. Other suitable determination methods for the median particle size are the Brunauer-Emmett-Teller adsorption method (BET) or X-ray diffractometry (XRD). The primary particles may take the form of aggregates or agglomerates. Aggregates are understood to be secondary particles durably combined by way of sinter bridges. Aggregates cannot be separated by dispersion processes.

Suitable metal oxide powders are, by way of example, antimony tin oxide powders or indium tin oxide powders (ITO), these having particularly good electrical conductivity. Doped variants of the metal oxide powders mentioned are also suitable. Appropriate products are obtained in high purity by the sol-gel process and are commercially available from various producers. The median primary particle sizes are in the range from 5 to 50 nm. The products comprise a certain proportion of agglomerates and aggregates composed of individual particles. Agglomerates are understood to be secondary particles held together by Van der Waals forces and separable by dispersion processes.

It is particularly preferable to use an indium tin oxide powder which has from 10 to 80, preferably from 20 to 60, % by volume content of aggregated particles whose particle size is from 50 to 200 nm. The % by volume content may be determined with the aid of a particle-analyzer device (e.g. Laser Particle Analyzer from Coulter or BI-90 Particle Sizer from Brookhaven), using dynamic light scattering to determine a volume-averaged or intensity-averaged diameter.

A suitable indium tin oxide powder may be obtained by the Aerosil preparation process, by converting the appropriate metal chloride compounds into the metal oxides in a high-temperature flame. During the incorporation of the indium tin oxide powder into the lacquer system, the agglomerated particles may to some extent revert to aggregates of a few individual particles and to individual particles (primary particles). The content of aggregated particles whose particle size is from 50 to 200 nm should preferably not fall below 5, preferably not below 10%. From 25 to 90% content of particles agglomerated in a chain-like series is advantageous in the lacquer system. These chain-like aggregates may also have branching or take the form of three-dimensional structures of series of particles.

From electron microscopy it can be seen that the aggregates form bridges between themselves.

Preparation of Indium Tin Oxide (ITO) Powder by the Aerosil Process

The preparation of indium tin oxide powder by the Aerosil process is subject matter of the patent application EP 127 0511 of Degussa AG (located at Hanau-Wolfgang, Germany).

The patent application mentioned describes a process for preparing indium tin oxides by mixing a solution of an indium salt with a solution of a tin salt, where appropriate adding a solution of a salt of at least one doping component, atomizing this solution mixture, pyrolyzing the atomized solution mixture and isolating the resultant product from the exhaust gases.

Salts which may be used comprise inorganic compounds, e.g. chlorides, nitrates and organometallic precursors, e.g. acetates, alcoholates. Where appropriate, the solution may comprise water, water-soluble, organic solvents, such as alcohols, e.g. ethanol, propanol, and/or acetone.

The method of atomizing the solution may use ultrasound mist makers, ultrasound atomizers, twin-fluid nozzles or triple-fluid nozzles. If the ultrasound mist maker or ultrasound atomizer is used, the resultant aerosol may be mixed with the carrier gas and/or N$_2$/O$_2$ air which is fed to the flame.

If use is made of the twin- or triple-fluid nozzle, the aerosol may be directly sprayed into the flame.

It is also possible to use water-immiscible organic solvents, such as ethers.

The method of isolation may use filters or cyclone.

The pyrolysis may take place in a flame produced by combustion of hydrogen/air and oxygen. Instead of hydrogen it is also possible to use methane, butane and propane.

Another pyrolysis method which may be used is an externally heated furnace. It is also possible to use a fluidized-bed reactor, a rotating tube or a pulsed reactor.

The inventive indium tin oxide may, by way of example, have been doped with the following substances in the form of the oxides and/or of the elemental metals: aluminium, yttrium, magnesium, tungsten, silicon, vanadium, gold, manganese, cobalt, iron, copper, silver, palladium, ruthenium, nickel, rhodium, cadmium, platinum, antimony, osmium, cerium, iridium, zirconium, titanium, calcium, potassium, magnesium, sodium, tantalum, or zinc, and the appropriate salts may be used here as starting materials. Particular preference may be given to doping with potassium, platinum or gold.

The resultant indium tin oxide (ITO) may, by way of example, have the following physical and chemical parameters:

| | |
|---|---|
| Median primary particle size (TEM) | from 1 to 200 nm, preferably from 5 to 50 nm |
| BET surface area (DIN 66131) | from 0.1 to 300 m$^2$/g |
| Structure (XRD) | cubic indium oxide |
| Mesopores by BJH method, DIN 66134 | from 0.03 ml to 0.30 ml/g |
| Macropores (DIN 66133) | from 1.5 to 5.0 ml/g |
| Bulk density (DIN ISO 787/11) | from 50 to 2000 g/l |

The Nanopowder e)

It has been found that lacquers with from 0.1 to 50% by weight content of (inert) nanoparticles and from 30 to 70% by weight of ITO, based in each case on dry film (i.e. the lacquer composition without the solvents) (components a), c), d), e) and f)) give lacquers capable of good curing. A preferred composition has from about 20 to 40% by weight of ITO and from 20 to 40% by weight of inert nanoparticles. The lacquers are mechanically stable and adhere well to the plastics substrate.

Surprisingly, lacquers with some content of inert inorganic particles, e.g. SiO$_2$ nanoparticles, adhere well and have good, and not reduced, electrical conductivity.

The SiO$_2$ nanoparticles are produced in a manner known per se and marketed by Clariant GmbH with the trademark Highlink OG. Products with the trade name Nanocryl from the company Hanse-Chemie, Geesthacht are also suitable.

Inert nanoparticles are understood to mean not only the abovementioned Highlink OG but also the following substances and classes of substances: organosols and silica sols, these being substantially composed of SiO$_2$ or Al$_2$O$_3$ or combinations of these. Other oxidic nanoparticles are also suitable, examples being zirconium oxide, titanium dioxide, iron oxide. It is also possible to use fine-particle destructured fumed silicas; These differ from the traditional fumed silicas in that they do not thicken the lacquer to any comparatively major extent.

It is also possible to incorporate functional nanoparticles into the lacquer, these contributing to the electrical conductivity to the same extent as indium tin oxide, or to a lesser extent. By way of example, antimony tin oxide or zinc oxide is suitable.

For the purposes of the invention, functional nanoparticles are understood to be particles which improve or maintain the conductivity of the overall composite by contributing to the conduction of electricity.

An indirect contribution not covered by this meaning can also result from the fact that the presence of the inert nanoparticles displaces the functional nanoparticles into conductor-track-like structures, thereby indeed improving the conductivity. An example of this is a lacquer composed of:

3 g of indium tin oxide
3 g of SiO$_2$ nanoparticles (13 nm, Highlink OG 502-31) (inert nanoparticles)
3 g of acrylate mixture (composition see below)
7 g of isopropanol
0.08 g of silane GF 16 (Wacker)
and 2% of photoinitiator, based on acrylate After UV curing this lacquer gives an antistatic layer whose surface resistance is <10 exp 6 ohm.

In another example, the procedure was as above except that nanoparticles with a particle size of 9 nm were used. The same result was obtained. For comparison, a lacquer was prepared with identical ITO concentration, but without nanoparticles. Instead of the inert nanoparticles, acrylate was used. The surface resistance found is 10 exp 9 ohm.

The Coatable Mouldings

Suitable coatable mouldings are composed of plastic, preferably of a thermoplastic or thermally deformable plastic.

Suitable thermoplastics are, by way of example, acrylonitrile-butadiene-styrene (ABS), polyethylene terephthalates, polybutylene terephthalates, polyamides, polyimides, polystyrenes, poly-methacrylates, polycarbonates, impact-modified polymethyl methacrylate or other mixtures (blends) composed of two or more thermoplastics. Polyolefins (polyethylenes or polypropylenes or cycloolefin copolymers, such as copolymers composed of ethylene and norbornene) are also coatable after suitable pre-treatment, such as corona treatment, flame treatment, plasma-spraying or etching.

Preference is given to the transparent plastics. A particularly preferred coatable substrate is a moulding composed of extruded or cast polymethacrylate, because this type of plastic has high transparency. Polymethyl methacrylate is composed of at least 80, preferably from 85 to 100, % by weight of methyl methacrylate units. Where appropriate, other comonomers capable of free-radical polymerization may be present, an example being $C_1$-$C_8$-alkyl (meth)acrylate. Suitable comonomers are, by way of example, esters of methacrylic acid (e.g. ethyl methacrylate, butyl methacrylate, hexyl methacrylate, cyclohexyl methacrylate), esters of acrylic acid (e.g. methyl acrylate, ethyl acrylate, butyl acrylate, hexyl acrylate, cyclohexyl acrylate, or styrene and styrene derivatives, for example α-methyl-styrene or p-methyl-styrene.

The molecular weight of cast polymethyl methacrylate is too high to permit thermoplastic processing. However, this material is thermally deformable (thermoelastic).

The mouldings to be coated may have any desired shape. However, preference is given to sheet-like mouldings, because these can be coated particularly easily and effectively on one side or on both sides. Examples of sheet-like mouldings are solid sheets or hollow panels such as sandwich panels or more specifically twin-web sandwich panels or multiweb sandwich panels. By way of example, corrugated sheets are also suitable.

The mouldings to be coated may have a matt, smooth or structured surface.

Lacquer, Preparation Process and Mixing Specification:

Lacquer Base Material:

Suitable lacquers are mentioned by way of example in DE 101 29 374. In one particularly preferred embodiment use is made of radiation-curable lacquers. An advantage of radiation-curable lacquers over physically-drying, chemically-curing or heat-curing systems is that they convert from the liquid to the solid state within seconds, form a chemicals-resistant, scratch-resistant coating on appropriate crosslinking and require comparatively little space for handling. Due to the short time between coating application and lacquer curing, any undesired sedimentation of the high-density metal oxide particles in the lacquer can be very substantially prevented, as long as the lacquer is adjusted to adequately high viscosity.

UV-curable Lacquer

For dispersing the ITO filler and the nanoparticles e), the lacquer without ITO filler additive has to have low viscosity (parameters), in order that the amount of from 40 to 50%, where appropriate even up to 70%, of ITO filler can be introduced into the lacquer while still retaining adequate capability for processing, for dispersion, and for application. An example of a method for this selects suitable low-viscosity reactive diluents or adds solvents, e.g. alcohols. At the same time, any sedimentation of the ITO particles in the lacquer has to be effectively inhibited by adding suitable thickeners. An example of a method for this adds suitable polymers. An example of suitable polymers is given by polymethacrylates, e.g. PLEX 8770 F, or polymethacrylates having functional groups; other suitable polymers or oligomers are mentioned above in the section "The lacquer system composed of a), b) and c)". Suitable polymers feature a certain polarity, as a result of which they can interact with the other constituents of the lacquer and with the polar surface of the ITO. Completely non-polar poly- or oligomers or poly- and oligomers with a small number of polar groups are unsuitable for the thickening process, because they cannot interact with the other lacquer constituents and are incompatible with the lacquer. Sufficiently polar oligo- or polymers contain polar groups selected from the group alcohol, ether, polyether, ester, polyester, epoxide, silanol, silyl ether, silicon compounds having substituted aliphatic or aromatic radicals, ketone, urea, urethane, halogen, phosphate, phosphite, sulphate, sulphonate, sulphite, sulphide, amine, polyamine, amide, imide, carboxylic acid, sulphur heterocycles, nitrogen heterocycles and oxygen heterocycles, phenyl and substituted aromatic groups, polynuclear aromatics including those having hetero atoms in the ring. Highly polar oligo- or polymers are likewise unsuitable, since their action on the properties of the finished lacquer is disadvantageous. Among the unsuitable highly polar groups are polyacids or salts of polybasic acids. A feature often resulting from unsuitable groups is increased water-solubility or -swellability. The concentration of the suitable polar groups has to be selected in such a way that the swellability of the lacquer does not exceed a certain level. The concentration at which the suitable polar groups are used is therefore one which ensures that the lacquer is not water-soluble and is not substantially swellable. This is ensured if the molar content of the polar groups is from 0.4 to 100 milliequivalents per 100 g of the abovementioned polymer. Polar groups which may be mentioned are hydroxy groups, carboxy groups, sulphonylcarbonamide groups, nitrile groups and silanol groups. The polar groups have differing activity. This increases in the sequence nitrile<hydroxy<primary carbonamide<carboxy<sulphonyl<silanol. The stronger the polarizing action, the lower the required content in the polymer.

Particularly suitable thickeners are systems which cannot migrate. These systems may, by way of example, be fixed by binding to the lacquer. The method for this may be physical or chemical binding to the lacquer, e.g. by copolymerization. Very particular preference is given to oligo- or polymeric, copolymerizable acrylates or oligo-/polymers which, by way of example, post-crosslink by way of sulphur bridges, e.g. PLEX 8770 F from Röhm GmbH & Co. KG.

To illustrate the effect of the ITO on the viscosity of the lacquer, the viscosity of a lacquer without ITO was determined using a Brookfield LVT viscometer (adapter A). The viscosity found is 4.5 mPa·s. The same lacquer was filled with, based on binder, the same proportion by weight of ITO and likewise tested in the Brookfield LVT viscometer (Spindle 2) at various rotation rates. Marked pseudoplasticity is found:

| Speed | Viscosity, mPa · s |
|---|---|
| 6 | 3450 |
| 12 | 1900 |
| 30 | 840 |
| 60 | 455 |

The composition of the lacquer was:
24.5 parts of ITO
24.5 parts of acrylate mixture
50 parts of isopropanol
0.5 part of dispersing additive
0.5 part of photoinitiator The lacquer without ITO correspondingly had the following composition:
32.45 parts of acrylate mixture
0.66 part of dispersing additive
0.66 part of photoinitiator
66.22 parts of isopropanol The acrylate mixture used comprises a mixture of about 40% by weight of pentaerythritol tritetraacrylate [sic] and about 60% of hexanediol diacrylate. The dispersing additive used comprises silane GF 16 from Wacker Chemie. Irgacure 184 is used as photoinitiator.

If the viscosity of the lacquer is too high, for example because no solvent was added, it is impossible to disperse a sufficient amount of ITO into the material. A mixing specification composed of, by way of example, 60 parts of hexanediol diacrylate, 40 parts of pentaerythritol tritetraacrylate [sic] can incorporate only from about 30 to 40 parts of ITO as filler. Above that amount of filler the lacquer is so viscous that it becomes impossible to process.

Due to the pseudoplasticity of the lacquer, it is advantageous to shear the lacquer during application. The result of this is uniform wetting and good flow. Suitable application techniques are, by way of example, roller application and spray application. Pouring or flowcoating of the lacquer is unsuitable.

Particular Embodiments:

The lacquer may be adjusted via selection of suitable monomers in such a way as to ensure good curing throughout in the presence of air (atmospheric oxygen). Examples are a reaction product from the reaction of propanetriol triacrylate with hydrogen sulphide (PLEX6696 from Röhm GmbH &

Co. KG). Although the lacquers cure under nitrogen more rapidly or using a smaller amount of photoinitiator, curing in air is possible if, by way of example, a suitable photoinitiator is used, for example Irgacure 907.

By way of example, another method of achieving this incorporates $SiO_2$ nanoparticles into the lacquer matrix. Suitable products are monodisperse nanoparticles, e.g. those marketed in the form of organosols by Clariant with the name Highlink OG. Fumed silicas marketed by Degussa with the name Aerosil are also suitable. It is particularly preferable to use fine-particle destructured fumed silicas, because these have only little effect on the viscosity of lacquers.

Among the destructured silicas are products which have been prepared by the Degussa Aerosil process in the form of aggregates of primary particles, the primary particle dimensions being from a few nanometers to a few hundred nanometers, and which have been brought substantially or completely to a size below 100 nanometers through suitable choice of production parameters or through post-treatment in relation to the particle size of their secondary and tertiary structures. Products complying with this property profile are described in EP 0808880 B1 of Degussa AG.

It has been found that the lacquers with from 10 to 40% content of (inert) nanoparticles and from 20 to 50% content of ITO, based in each case on dry film (i.e. the lacquer composition without the solvent) are lacquers with good curing ability. The lacquers are mechanically stable and have good adhesion to the plastics substrate.

Surprisingly, lacquers with some content of inert inorganic particles, e.g. $SiO_2$ nanoparticles or other nanoparticles with an oxidic basis, have good adhesion and good, and not reduced, electrical conductivity.

The assumption is that the filler particles in some way force the indium tin oxide particles into conductor-track-like structures, thereby improving electrical conductivity by raising the concentration of the conductive particles. The result is that the ITO concentration can be reduced for the same conductivity.

The organosols marketed by Clariant with the name Highlink OG comprise mono- or difunctional monomers which, where appropriate, may bear other functional groups. Organosols in organic solvents, e.g. alcohols, are also suitable. Examples of monomers with good suitability are hexanediol diacrylate and hydroxyethyl methacrylate. Minimum amounts of polymerization inhibitor should be present in the monomers. Suitable stabilizers are Tempol from Degussa or phenothiazine. The stabilizer concentrations present in the monomers are generally as little as <500 ppm, in one preferred embodiment <200 ppm and particularly preferably <100 ppm. The stabilizer concentration in the ready-to-coat UV lacquer should be below 200 ppm, preferably below 100 ppm and very particularly preferably below 50 ppm, based on reactive components. The selected stabilizer concentration depends on the nature and reactivity of the selected polymerizable components. Particularly reactive components, e.g. some polyfunctional acrylates or acrylic acid, require relatively high amounts of stabilizer, but components with lower reactivity, e.g. monofunctional methacrylates, require smaller amounts of stabilizer. The stabilizer used may comprise not only Tempol and phenothiazine but also, by way of example, the monomethyl ether of hydroquinone, the first two being effective even in the absence of oxygen and being used in amounts as small as from 10 to 100 ppm, whereas the latter compound is effective only in the presence of oxygen and is used in amounts of from 50 to 500 ppm.

The lacquer may be adjusted to be scratch-resistant, chemicals-resistant or flexible and formable via the selection of the composition. The content of crosslinking agent is adapted in a suitable manner for this purpose. By way of example, high content of hydroxyethyl methacrylate may be used to improve the adhesion to difficult substrates, e.g. cast high-molecular-weight PMMA, while at the same time improving formability. A relatively high content of hexanediol diacrylate improves chemicals resistance and scratch resistance.

Still better scratch resistance and chemicals resistance is achieved by way of monomers of still higher functionality, e.g. pentaerythritol tritetra-acrylate [sic]. The composition of the lacquer is varied here in such a way as to obtain a desired combination of all of the properties demanded.

One way of increasing formability and improving adhesion consists in using oligomeric or polymeric components which may be selected either to be reactive with double-bond content or to be non-reactive. The use of relatively high-molecular-weight structural units reduces the crosslinking density and the shrinkage of the lacquer during curing, the result generally being better adhesion.

Suitable polymeric components are poly(meth)acrylates, which, by way of example, may be composed of methacrylates and of acrylates and of functional monomers. Polymers having functional groups may be used in order to provide a further contribution to improvement of adhesion. An example of a suitable polymethacrylate is PLEX 8770 F from Röhm GmbH & Co. KG with a viscosity number J [ml/g] (in $CHCl_3$ at 20° C.): 11±1, this being a measure of the molecular weight.

Different amounts of the oligo- or polymeric additives may be added, depending on molecular weight. The amounts of relatively high-molecular-weight polymers used are correspondingly relatively small and the amounts of relatively low-molecular-weight products are relatively large, the result being that the overall viscosity of the lacquer permits processing. The polymeric additives act as thickener while at the same time being utilized in order to retain the nano-particles in suspension and to inhibit undesired sedimentation of the particles after the coating process.

This method ensures that the ITO concentration at the surface, especially in the uppermost 200 nm of the layer, is not substantially lower than in the bulk or at the interface with the substrate. Another important aspect of this measure is improvement in substrate adhesion via addition of the thickener. One explanation of this, without, however, intending to bind the invention to any particular theory, is the reduction which the thickener brings about in the ITO concentration at the interface with the substrate, thus at the same time maintaining an advantageously and sufficiently high concentration of binder at the interface, since the binder contributes to good substrate adhesion. In contrast, inorganic fillers, e.g. ITO give rise to poorer substrate adhesion by reducing the area of contact between substrate and binder, especially if the concentration of these in that region increases due to sedimentation towards the lacquer/substrate interface.

Preparation Process:

It is important that the lacquer viscosity be adjusted in such a way as to ensure good milling/dispersing of the ITO particles. By way of example, this may be achieved by dispersing on a roller bed using glass beads as grinders (see DE 101 29 374).

Another method of dispersing ITO nanoparticles in the lacquer uses specialized combined mixing and dispersing assemblies combined with forced conveying, e.g. Unimix LM6 from Haagen and Rinau GmbH. In order to achieve sufficiently good dispersion without breaking down the ITO aggregates when using the combined mixing and dispersing assembly, the adjustment of the mixing conditions must be such that the nanoparticle agglomerates are comminuted into sufficiently small aggregates, thus providing good transparency of the coating. For sufficient transparency, aggregates are to be smaller than a quarter of the lambda of visible light, i.e. not greater than 100 nm. If the mixture is sheared too severely or for too long, aggregates which make a considerable contribution to the conductivity are broken down, thus preventing correct formation of the percolation network. Information concerning the effect of shear on the percolation network is found by way of example in: Hans J. Mair, Siegmar Roth (eds.), Elektrisch leitende Kunststoffe [Electrically conducting plastics], Hanser Verlag, 1986 and in "Ishihara Functional Materials", Technical News, T-200 Electroconductive Materials, company publication Ishihara;

A significant point within the invention is therefore that the shear is adjusted in such a way that aggregates in the percolation network are retained and coarser-particle agglomerates larger than one quarter of lambda are broken down.

This is achieved via selection of the dispersing devices and dispersing conditions, via selection of the suitable viscosity of the composition and via any additions of suitable additives.

Suitable additives are mentioned, by way of example, in EP 281 365 (Nippon Oil & Fats).

Model for Electrical Conduction:

The antistatic action can be ideally effective if the percolation network is based on conductive particles arranged in a series like a string of pearls and in contact with each other. This optimizes the cost/benefit ratio for the comparatively expensive ITO. At the same time there is an improvement in transparency and a reduction in the haze of the coating, because it is possible to minimize the content of scattering particles. The percolation limit depends on the morphology of the particles. Assuming spherical primary particles, the percolation limit is achieved at about 40% by weight of ITO. If acicular ITO particles are used, sufficient contact of the particles takes place even at a relatively low concentration. However, acicular particles have the disadvantage of disadvantageous action on transparency and haze.

An object of the invention is therefore to reduce the amount of ITO required to construct a percolation network by using inert nanoparticles. There is no attendant sacrifice in transparency of the entire system when the inert nanoparticles are added, and the system is given other advantageous properties, e.g. capability for curing under atmospheric oxygen without loss of properties, greater hardness, better formability, good substrate adhesion.

The examples show that the conductivity achieved through the use of nanoparticles with as little as 33% of ITO is identical to that achieved with 50% of ITO in lacquers without nanoparticles.

Coating Technique:

The method of coating has to be selected in such a way that the lacquer can be applied at a low and uniform thickness. Suitable methods are, by way of example, use of a wire-wound doctor bar, immersion, spreading, roller-application and spraying. In methods known to the person skilled in the art, the viscosity of the lacquer has to be adjusted in such a way that, after evaporation of any solvent added, the wet film has a layer thickness of from 2 to 15 µm. With thinner layers, scratch resistance is lost, and these can exhibit a matt effect through protrusion of metal oxide particles from the lacquer matrix. Thicker layers are associated with loss of transmittance, and do not increase electrical conductivity and are not advisable for reasons of cost. However, for reasons of abrasion of lacquer surfaces through constant mechanical loading it may be advisable to formulate thicker layers. In this case, layer thicknesses as high as 100 µm may be formulated, and, where appropriate, the viscosity of the lacquer has to be increased to produce the thick layers.

Curing:

One of the factors necessary in order to achieve sufficient curing throughout is appropriate matching of the nature and concentration of the photoinitiator. Combinations of photoinitiators are sometimes needed in order to obtain sufficient surface and in-depth curing of the lacquer. In particular in the case of high filler levels using metal oxide particles, it is advisable to combine conventional photoinitiators (e.g. Irgacure 1173 or Irgacure 184 from Ciba) with photoinitiators which absorb in the relatively-long-wavelength region (e.g. Lucirin TPO or Lucirin TPO-L from BASF), in order to obtain sufficient in-depth curing. In the case of transparent substrates it is sometimes advisable to cure the coated substrate from the upper and lower side by irradiation, using offset UV radiation. Required initiator concentrations are from 0.5% up to 8%, preferably from 1.0 to 5% and very particularly preferably from 1.5 to 3% of photoinitiator. For curing under inert gas here an amount of from 0.5 to 2% of photoinitiator, based on acrylate, is sufficient, while for curing under air amounts of from 2 to 8%, preferably from 4 to 6%, are required. It is advantageous to use a minimum initiator concentration in order to minimize the amount of decomposition products in the lacquer, because these have an adverse effect on long-term weathering resistance. For reasons of cost-effectiveness, too, the use of a minimum amount of initiator is advisable.

As an alternative to curing with UV radiation, it is also possible to cure the coating with other high-energy radiation. One suitable method is irradiation with electron beams. An advantage of this process over UV radiation is good curing through thick layers and the opportunity of curing more rapidly in the presence of atmospheric oxygen and even without photoinitiators. The energy of the radiation has to be adjusted in such a way that sufficient curing of the layer occurs without damage to the substrate or yellowing.

Low-shrinkage Mixing Specifications:

One significant aspect of the invention is the low-shrinkage curing of the lacquer. UV-curable lacquers naturally shrink during radiation curing, the result being that the lacquer surface can be adversely affected and the adhesion to the substrate can be lost. The shrinkage of the lacquer can be reduced to a minimum via sophisticated selection of the ratio of mono-, di- and polyfunctional monomers and, respectively, oligomers, and of inorganic and polymeric fillers and of additives. Inert fillers which do not participate in the polymerization, e.g. metal oxides, such as indium tin oxide, silicon dioxide, or unreactive polymeric constituents reduce the overall shrinkage of a composition, while monovalent monomers and oligomers shrink moderately and polyvalent monomers make the greatest contribution towards shrinkage.

By way of example, a low-shrinkage mixing specification may be obtained if the content of the polyvalent components does not exceed a certain level. In this context, the relationship between molecular weight, number of functional groups and shrinkage has to be taken into account. Polyvalent components with low molecular weight naturally have the highest shrinkage, while monovalent components with relatively high molecular weight make the smallest contribution towards shrinkage.

Examples of low-shrinkage mixing specifications are compositions composed of:

EXAMPLE 1

100 parts of solvent, e.g. ethanol or isopropanol
35 parts of hydroxyethyl methacrylate
15 parts of $SiO_2$ nanoparticles[1)]
50 parts of indium tin oxide nanoparticles
2 parts of photoinitiator
and, where appropriate, other additives The coatings obtained have good adhesion with some degree of flexibility. By way of example, PMMA foils coated with this material can be curved or deformed to a certain degree. The $SiO_2$ nanoparticles may, by way of example, be used in the form of an organosol of inorganic nanoparticles in hydroxyethyl methacrylate, this being marketed by Clariant with the name Highlink OG. The coatings using the mixing specification mentioned are mechanically stable, but not scratch-resistant. The scratch-resistance of coatings of this type can be increased by replacing some of the organosol by di- or polyfunctional acrylates. An example of a scratch-resistant low-shrinkage mixing specification is the following composition:

EXAMPLE 2

100 parts of solvent, e.g. ethanol or isopropanol
17.5 parts of hydroxyethyl methacrylate
7.5 parts of $SiO_2$ nanoparticles[1)]
25 parts of hexanediol diacrylate
50 parts of indium tin oxide nanoparticles
2 parts of photoinitiator,
and, where appropriate, other additives 1) in the form of Highlink OG 100-31 with 100 ppm of stabilizer (producer Clariant)

A precondition for good curing is the use of an organosol with particularly low stabilizer content. Thus each of the examples mentioned uses an organosol with 100 ppm of Tempol® stabilizer or, respectively, phenothiazine stabilizer. When comparison is made with the lacquer using commercially available highly-stabilized organosol (500 ppm of phenothiazine), better adhesion (cross-cut CC=0) is obtained, as is better curing under inert gas (nitrogen) and in air.

An alternative method, in order to minimize the stabilizer content in the lacquer, uses a stabilizer-free organosol of $SiO_2$ nanoparticles in organic solvents, e.g. alcohols, for introducing the nanoparticles into the lacquer matrix.

Effect of Curing Conditions on Shrinkage:

The shrinkage can be influenced not only by way of the mixing specification but also by way of selection of suitable curing conditions. Slow curing using a comparatively small amount of radiative energy is advantageous, while a higher level of shrinkage is observed when curing is rapid and a larger amount of radiative energy is used.

Advantageous curing conditions are obtained using a F450 source from Fusion with 120 watts/cm and a focused beam with an advance rate of from 1 to 3 m/min and 2% photoinitiator content, under nitrogen.

Scratch Resistance of Lacquers:

Another feature of the invention is the good scratch resistance of the antistatic lacquers. If the curing conditions described are selected, scratch-resistant antistatic lacquers with low shrinkage and good adhesion can be produced.

Lacquers of the invention with from 33 to 50% ITO content achieve scratch resistances of delta haze<2% after testing on the Taber Abraser using CS 10F abrasion wheels and applying a weight of 5.4 N at 100 revolutions.

Chemicals Resistance of Lacquers

The inventive lacquers have good resistance to chemicals, e.g. inorganic acids and alkaline solutions during short exposure, and to numerous organic solvents, such as esters, ketones, alcohols, aromatic solvents. By way of example, these solvents may, if required, be used for cleaning plastics articles coated with the inventive lacquers.

Weathering Resistance and Mixing Specification:

One particular advantage of the use of low-stabilizer-content formulations is the opportunity to cure in air and thus to reduce inertization costs (apparatus cost and running costs for inert gas consumption). Another advantage is that good bulk curing is achievable even when comparatively small amounts of photoinitiator are used. The formulations mentioned in the examples, and formulations in which no $SiO_2$ nanoparticles were used, mono- or polyfunctional monomers or mixtures of the same having been used instead of the organosols, can be cured to give scratch-resistant and weathering-resistant formulations using in each case 2% of photoinitiator, e.g. Irgacure 184, Irgacure 1173, Irgacure 907 or mixtures of the same.

EXAMPLE 3

100 parts of solvent, e.g. ethanol or isopropanol
40 parts of pentaerythritol tritetraacrylate [sic]
60 parts of hexanediol diacrylate
50 parts of indium tin oxide nanoparticles
5 parts of $SiO_2$ nanoparticles
2 parts of photoinitiator
and, where appropriate, other additives

EXAMPLE 4

As example 3, except:
5 parts of PLEX 8770 (thickener)
20 parts of pentaerythritol tritetraacrylate [sic]
75 parts of hexanediol diacrylate The abovementioned formulations may also be treated with UV stabilizers to increase weathering resistance. Care has to be taken here that the UV stabilizer does not inhibit radiation curing.

In one preferred embodiment of the invention, electron beams are used for curing. This avoids the occurrence of disadvantageous interactions between UV absorber and UV light.

If the radiation source used comprises a UV lamp, use may be made, by way of example, of long-wavelength UV light in combination with a photoinitiator which absorbs in the long-wavelength region of the spectrum or in the visible region of the spectrum. Complete absorption by the UV absorber in the absorption region of the photoinitiator is not permissible, in order that the amount of high-energy light passing into the lacquer is sufficient for radiation curing.

If the intention is to operate with conventional UV lamps, e.g. System Fusion or IST Strahlentechnik, the UV absorber used may comprise one which provides an adequately large window within the absorption region for transmission of UV radiation to excite the photoinitiator. Norbloc 7966, Tinuvin 1130 are suitable UV absorbers.

A combination of the measures mentioned, in particular the use of small amounts of photoinitiator, permits production of weathering-resistant long-lifetime coatings. The small amount of photoinitiator results in low content of cleavage products, the result of this being very few sites of attack for the migration of the same. The lacquers mentioned therefore pass the artificial accelerated-weathering test (Xenotest in accordance with DIN No.) over 5000 hours without losing their adhesion, scratch resistance and good transmittance.

The plastics moulding can be used as glazing or glazing element, for encasing structures, for equipping cleanrooms in the medical, biological or microelectronics sector, for machine covers, for incubators, for displays, for visual display screens and visual-display-screen covers, for back-projection screens, for medical apparatus, and for electrical devices as protective screening.

Other Applications

Antistatic coatings may be used not only for transparent applications but also on non-transparent substrates. Examples are: antistatic plastics floorcoverings, and generally the lamination of antistatic, scratch-resistant films to substrates such as wood, decorative papers. Another application is the coating of decorative papers with curing under electron beams.

Particle Size Determination by PCS (Following Ultrasound)
1. Reagents Distilled or demineralized water, pH>5.5
2. Equipment LR 34 laboratory dissolver with rotation rate meter, Pendraulik, 31832 Springe 1
   Dispersing disc, diameter 40 mm
   UP 400 S ultrasound processor, Dr. Hielscher, 70184 Stuttgart H7 titanium sonotrode, 7 mm diameter
   HORIBA LB-500 particle size analyzer, Retsch Technology, 42781 Haan with single-use acrylic cells 1.5 ml
   Hoechst container, identity no. 22926, 250 ml capacity, DDPE, 0/0021 uncoloured, Hoechst AG Dept. EK-Verpackung V, Brüningstr. 64, 65929 Frankfurt-Hoechst Lid for container, 250 ml, identity no. 22918
   Pasteur pipettes, 3.5 ml, 150 ml long, order no. 1-6151
   Precision balance (can be read to accuracy of 0.01 g)
3. Preparation of a 1% Strength Dispersion
   The powder specimen (from about 10 to 100 g) is homogenized by manual shaking in the storage vessel (30 sec). The specimen is allowed to stand for at least 10 min. for de-aeration.
   The precision balance (which can be read to 0.01 g accuracy) is used to weigh out the powder. 1 g of powder (±0.02 g) is placed in the PE container and topped up to 100 g (±0.02 g) with deionized water.
   Dispersion of Specimen
   The specimen is pre-dispersed for five minutes in the covered polybeaker at 2000 rpm, using the laboratory dissolver, and then dispersed using ultrasound for four minutes at an amplitude of 80% and cycle=1.
4. Determination of Particle Distribution
   Theoretical: The test method describes the determination of particle size distribution by photon correlation spectroscopy (PCS, "dynamic light scattering"). The method is particularly suitable for measuring particles and their aggregates in the submicrometer region (from 10 nm to 3 µm). The HORIBA LB-500 equipment used uses a back-scattering optical system in which the ratio between single and multiple scattering is almost constant and can therefore be ignored. For this reason it is also possible to take measurements on dispersions with relatively high concentrations without producing spurious measurements. The following parameters have to be known for precise particle size distribution determination:
   Dispersion temperature: A constant temperature is important in order to exclude convection within the cell, which would become superimposed upon the free movement of the particles. The HORIBA LB-500 measures the temperature in the cell and takes the temperature measurement into account in the evaluation process.
   Dispersion medium viscosity: Non-critical for dilute systems, because the viscosities of the pure solvents are well-known, e.g. at 25° C. Excessively high concentrations are problematic if the viscosity of the dispersion exceeds that of the liquid phase (mostly water), because the movement of the particles then becomes restricted. For this reason, the measurements are mostly carried out at about 1% solids concentration.
   Refractive index of particles and dispersion medium: These data are listed for the majority of solids and solvents in the HORIBA software.
   The dispersion has to be stable with respect to its sedimentation. Sedimentation within the cell not only generates additional movement of the particles but also causes a change in scattered light intensity during the measurement process. In addition, the result is a decrease in the concentration of relatively large particles in the dispersion, these accumulating on the base of the cell.
   Measurement process: The measurement equipment is controlled by way of a computer programme which also evaluates the measurement signal and allows the results of measurement to be saved and printed.
   Prior to each measurement process or series of measurements, the following settings have to be established within the software:
   input of refractive indices of particle and medium
   input of viscosity of dispersion medium
   identification and comments concerning the specimen
   A Pasteur pipette is used to transfer the specimen dispersed using dissolver and ultrasound into the 1.5 ml single-use acrylic cell. Once this has been placed into the measurement chamber of the PCS device and the temperature sensor has been introduced from above into the dispersion, the measurement process is started with the aid of the software ("Messung" [measurement] button). After a waiting time of 20 s, the window "Messanzeige" [measurement display] opens and indicates the current distribution of particles every 3 seconds. The actual measurement process is started by again pressing the measurement button in the Messanzeige window. Depending on the pre-set, the various measured results (e.g. d50, d10, d90, standard deviation) are used to indicate the particle distribution after 30-60 s. In the case of highly-varying d50 values (e.g. 150 nm±20%; this can occur in the case of very broad distributions) from about 6 to 8 measurements are carried out, from 3 to 4 being otherwise sufficient.
5. d50 Value Data
   The average (with no decimal places) of all of the d50 values measured, with the exception of any obvious deviant values, is given in nm.

The invention claimed is:
1. A process for producing a moulding, comprising:
   coating a moulding of a plastic on one or more sides with a lacquer composition, to obtain a coating on said moulding; and
   curing said coating on said moulding;
   said lacquer composition comprising:
   a) a binder or a binder mixture;
   b) optionally, a solvent or solvent mixture;
   c) optionally, other additives;

d) optionally, a thickener or thickener mixture comprising from 0 to 20% of polymeric thickeners and from 0 to 40% of oligomeric thickeners, in each case based on a dry film of components a, c, d, e;

e) from 5 to 500 parts by weight, based on a), of an electrically conductive metal oxide powder with a median primary particle size of from 1 to 80 nm and a percentage degree of aggregation of from 0.01 to 99%, wherein said degree of aggregation is based on aggregates which comprise at least two primary particles;

wherein a particle size of the aggregated particles is 50 to 200 nm;

and wherein 25 to 90% of the particles are agglomerated in a chain-like series;

f) from 5 to 500 parts by weight, based on a), of inert nanoparticles.

2. The process according to claim 1, wherein a mixture of components a)-c) has a viscosity of from 5 to 500 mPa.s as measured in a Brookfield LVT viscometer.

3. The process according to claim 1, wherein a mixture of components a)-e) has a viscosity of from 150 to 5000 mPa.s.

4. The process according to claim 1, wherein said inert nanoparticles comprise $SiO_2$ nanoparticles.

5. The process according to claim 1, wherein the electrically conductive particles comprise a mixture comprising ITO, antimony tin oxide (ATO), doped ITO or mixtures thereof.

6. A plastics moulding, obtained by a process of claim 1, wherein the plastics moulding comprises at least one of PMMA, PC, PET, PET-G, PE, PVC, ABS or PP.

7. The process according to claim 1, wherein component b) is present.

8. The process according to claim 1, wherein component c) is present.

9. The process according to claim 1, wherein component d) is present.

10. The process according to claim 1, wherein component d) is present and comprises a copolymer of (meth)acrylates.

11. The process according to claim 1, wherein component d) is present and comprises oligomeric epoxyacrylates, urethane acrylates, silicone acrylates, polyester acrylates, epoxy acrylates, polyethylene glycol diacrylates or mixtures thereof.

12. The process according to claim 1, wherein component e) is in an undispersed condition.

13. The process according to claim 1, wherein component e) comprises (i) an aggregate of primary particles, (ii) an agglomerate of primary particles and aggregates, or (iii) combinations of (i) and (ii).

14. The process according to claim 1, wherein component e) comprises an agglomerate of primary particles and aggregates, wherein a particle size of the agglomerate is up to 2000 nm.

15. The process according to claim 1, wherein component e) comprises an agglomerate of primary particles and aggregates, wherein a particle size of the agglomerate is up to 1000 nm.

16. The process according to claim 1, wherein component e) comprises an aggregate which comprises secondary particles durably combined by way of sinter bridges, wherein said aggregate cannot be separated by a dispersion process.

17. The process according to claim 1, wherein component e) comprises primary particles having a median primary particle size from 5 to 50 nm.

18. The process according to claim 1, wherein component e) comprises an agglomerate which comprises secondary particles held together by Van der Waals forces and separable by dispersion processes.

19. The process according to claim 1, wherein component e) comprises an indium tin oxide powder which has from 10 to 80% by volume content of aggregated particles whose particle size is from 50 to 200 nm.

20. The process according to claim 1, wherein component e) comprises indium tin oxide powder obtained by converting an metal chloride compound into a metal oxide in a high-temperature flame.

21. The process according to claim 1, wherein the chain-like aggregates have branching or take the form of three-dimensional structures of series of particles.

22. The process according to claim 1, wherein component e) comprises indium tin oxide having a median primary particle size from 1 to 200 nm, a BET surface area according to DIN 66131 from 0.1 to 300 $m^2/g$, a cubic structure of indium oxide, mesopores according to DIN 66134 from 0.03 ml to 0.30 ml/g, macropores according to DIN 66133 from 1.5 to 5.0 ml/g and a bulk density according to DIN ISO 787/11 from 50 to 2000 g/l.

23. The process according to claim 1, wherein said lacquer composition comprises from 0.1 to 50% by weight of inert nanoparticles and from 20 to 70% by weight of ITO, based in each case on a dry film.

24. The process according to claim 1, wherein said inert nanoparticles are $SiO_2$ nanoparticles.

25. The process according to claim 1, wherein said inert nanoparticles are organosols or silica sols.

26. The process according to claim 1, wherein said inert nanoparticles are $SiO_2$, $Al_2O_3$ or combinations thereof.

27. The process according to claim 1, wherein said inert nanoparticles are zirconium oxide, titanium dioxide, iron oxide or mixtures thereof.

28. The process according to claim 1, wherein said inert nanoparticles are fine-particle destructured fumed silicas.

29. The process according to claim 1, comprising functional nanoparticles.

30. The process according to claim 1, wherein the plastic is transparent.

31. The process according to claim 1, wherein a transparency of the moulding having a laquer coating without inert nanoparticles is substantially the same as the transparency of the moulding having a laquer coating with inert nanoparticles.

32. The process according to claim 1, wherein a conductivity in said coating which is achieved when using said nanoparticles and not more than 33% by weight of ITO is identical to a conductivity achieved when using no nanoparticles and 50% by weight of ITO.

33. The process according to claim 1, wherein component d) is present and comprises a copolymer of (meth)acrylates and a vinyl monomer in copolymerized form.

34. The process according to claim 1, wherein component d) is present and comprises a copolymer comprising methyl methacrylate and butyl acrylate.

35. The process according to claim 1, wherein component d) is present and comprises a polymer comprising about 75% by weight of methyl methacrylate and about 25% by weight of butyl acrylate.

36. The process according to claim 1, wherein component e) comprises indium tin oxide obtained by
mixing a solution of an indium salt with a solution of a tin salt, optionally adding a solution of a salt of at least one doping component, to obtain a solution mixture, atomizing said solution mixture, to obtain an atomized solution mixture, pyrolyzing the atomized solution mixture, thereby obtaining exhaust gases and isolating said indium tin oxide from the exhaust gases, wherein said indium salt is a chloride, nitrate, acetate, or alcoholate.

37. A glazing for encasing structures, for equipping cleanrooms, for machine covers, for incubators, for displays, for visual display screens and visual-display-screen covers, for back-projection screens, for medical apparatus, and for electrical devices comprising a plastics moulding according to claim 6.

* * * * *